United States Patent
Neumann et al.

(10) Patent No.: US 11,403,252 B2
(45) Date of Patent: *Aug. 2, 2022

(54) UNIVERSAL SERIAL BUS VOLTAGE REDUCING ADAPTER

(71) Applicant: Western Digital Technologies, Inc., San Jose, CA (US)

(72) Inventors: Charles Neumann, Lake Forest, CA (US); Robert P. Ryan, Mission Viejo, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/229,565

(22) Filed: Apr. 13, 2021

(65) Prior Publication Data

US 2021/0232532 A1 Jul. 29, 2021

Related U.S. Application Data

(63) Continuation of application No. 16/137,277, filed on Sep. 20, 2018, now Pat. No. 11,010,326.

(51) Int. Cl.
| | |
|---|---|
| *G06F 1/26* | (2006.01) |
| *G06F 1/3296* | (2019.01) |
| *G06F 13/42* | (2006.01) |
| *H01R 31/06* | (2006.01) |
| *G06F 1/3225* | (2019.01) |
| *G06F 1/28* | (2006.01) |
| *H01R 24/62* | (2011.01) |
| *H01R 107/00* | (2006.01) |

(52) U.S. Cl.
CPC ............ *G06F 13/4282* (2013.01); *G06F 1/28* (2013.01); *G06F 1/3225* (2013.01); *G06F 1/3296* (2013.01); *H01R 31/065* (2013.01); *G06F 2213/0042* (2013.01); *H01R 24/62* (2013.01); *H01R 2107/00* (2013.01); *H01R 2201/06* (2013.01)

(58) Field of Classification Search
None
See application file for complete search history.

(56) References Cited

U.S. PATENT DOCUMENTS

| | | | |
|---|---|---|---|
| 6,665,201 B1 | 12/2003 | Spencer et al. | |
| 2004/0073820 A1* | 4/2004 | Hsu .......................... | G06F 1/266 713/300 |
| 2004/0143768 A1* | 7/2004 | Calhoon ................... | G06F 1/26 713/300 |
| 2005/0037807 A1* | 2/2005 | Dove ..................... | H04W 92/00 455/556.1 |
| 2006/0181241 A1 | 8/2006 | Veselic | |
| 2009/0018456 A1* | 1/2009 | Hung ................. | A61B 5/02438 600/509 |

(Continued)

*Primary Examiner* — Hyun Nam
(74) *Attorney, Agent, or Firm* — Patterson + Sheridan, LLP; Steven H. Versteeg

(57) ABSTRACT

A method and apparatus are provided to receive a voltage at a first value at a voltage reducing adaptor, ascertain a voltage supply requirement for the memory arrangement to obtain and ascertained voltage supply requirement, reduce the voltage from the first value to the ascertained voltage supply requirement within the adaptor and supply the voltage at the ascertained voltage supply requirement to the memory arrangement.

20 Claims, 4 Drawing Sheets

(56) References Cited

U.S. PATENT DOCUMENTS

| | | |
|---|---|---|
| 2009/0300259 A1 | 12/2009 | Luo et al. |
| 2011/0058439 A1 | 3/2011 | Lee et al. |
| 2013/0036260 A1 | 2/2013 | Kurashige |
| 2013/0132758 A1 | 5/2013 | Shiba |
| 2015/0123663 A1 | 5/2015 | Brusila |
| 2015/0262665 A1 | 9/2015 | Katayose et al. |
| 2016/0126768 A1* | 5/2016 | Fust ..................... H02J 7/0044 320/114 |
| 2017/0357311 A1 | 12/2017 | Hovis et al. |
| 2018/0210517 A1 | 7/2018 | Yun |
| 2020/0097432 A1* | 3/2020 | Neumann ........... G06F 13/4282 |

\* cited by examiner

UNIVERSAL SERIAL BUS VOLTAGE REDUCING ADAPTER

CROSS-REFERENCE TO RELATED APPLICATIONS

This application is a continuation of co-pending U.S. patent application Ser. No. 16/137,277, filed Sep. 20, 2018, which is herein incorporated by reference.

BACKGROUND OF THE DISCLOSURE

Field of the Disclosure

Embodiments of the present disclosure generally relate to memory devices for computer apparatus. More specifically, aspects relate to apparatus and methods for voltage reduction for universal serial bus arrangements.

Description of the Related Art

Universal serial bus (USB) memory arrangements, such as solid state drives, thumb drives, memory sticks are being used with more frequency and there is a desire in the industry to increase usage of such devices as well as the capacity of such devices.

Generally, as the USB arrangements (devices) are expected to perform at higher levels, the performance speeds are pushed. Such increased performance consumes more power in the form of higher current from the power source. Successive USB devices generate elevated temperatures as compared to earlier generation devices.

Packaging technology has allowed some arrangements (devices) to be compacted into the connector housing itself such as a USB type A storage device. The device virtually disappears into the system it is plugged into. The side effect is reduced surface area to dissipate heat and the devices ability to cool is reduced. Thus compact devices will heat up faster The elevated temperatures, unfortunately, have a significant drawback. USB devices, such as solid state drives, perform more poorly compared to solid state drives that operate at lower temperatures. The poor operation may result in data loss or increase in latency of actions taken by the USB device. To counteract such poor operation, manufacturers of USB devices operate the USB device at a threshold that is lower than the point at which such poor operation starts. There is a cap, therefore, for conventional USB devices in the amount of performance that they may achieve.

There is a desire to operate denser USB devices at performance levels that were previously unattainable for conventional USB devices.

There is a need to provide for an adaptor to be used with conventional USB devices to reduce the power consumed and allow more heat to be dissipated.

SUMMARY OF THE DISCLOSURE

The present disclosure generally relates to providing an apparatus that can vary a voltage from a first voltage level to a second voltage level, wherein the apparatus has two USB connectors.

In one embodiment, an arrangement is disclosed comprising a first connector, a second connector, a body connected to the first connector and the second connector; wherein the first connector is configured to be connected to a computer host, the second connector is configured to connected to a solid state drive, voltage conversion circuitry configured to accept a voltage provided by a computer host at the first connector and reduce the voltage to a voltage output delivered to the second connector and at least one USB bus extending from the first connector to the second connector, the USB bus configured to send and receive signals to and from the computer host and the solid state drive.

In another embodiment, an arrangement is disclosed comprising a housing defining an interior volume, the housing configured with a cooling surface area, the housing a first end and a second end, a substrate placed in the interior volume, at least one universal serial bus contact connected to a first side of the substrate, the universal serial bus contact extending to the first end of the housing, at least one overmold section connected to the first side of the substrate, the overmold section extending to the second end of the housing and at least one memory arrangement connected to the at least one universal serial bus, wherein the memory arrangement is configured to store and retrieve data.

In another embodiment, a method of providing an electrical voltage to a memory arrangement is disclosed comprising: receiving a voltage at a first value at a voltage reducing adaptor; reducing the voltage from the first value to a second value, and transmitting the voltage through the voltage reducing adaptor to the memory arrangement.

In another embodiment, a method of providing an electrical voltage to a memory arrangement is disclosed comprising receiving a voltage at a first value at an voltage reducing adaptor, ascertaining a voltage supply requirement for the memory arrangement to obtain and ascertained voltage supply requirement, reducing the voltage from the first value to the ascertained voltage supply requirement within the adaptor and supplying the voltage at the ascertained voltage supply requirement to the memory arrangement.

In another embodiment, an arrangement for providing an electrical voltage to a memory arrangement is disclosed comprising means for receiving a voltage at a first value at an voltage reducing adaptor, means for ascertaining a voltage supply requirement for the memory arrangement to obtain and ascertained voltage supply requirement, means for reducing the voltage from the first value to the ascertained voltage supply requirement within the adaptor, means for transporting data from a first end of the arrangement to a second end of the arrangement and means for supplying the voltage at the ascertained voltage supply requirement to the memory arrangement.

In another embodiment, an arrangement for providing an electrical voltage to a memory arrangement is disclosed comprising means for transmitting data from a first end of the arrangement to a second end of the arrangement, means for receiving a voltage at a first value at an voltage reducing adaptor, means for reducing the voltage from the first value to a second value, means for transmitting the voltage through the voltage reducing adaptor to the memory arrangement, means configured to connect the arrangement to a host computer system to accept the voltage at the first value and means configured to connect the arrangement to the memory arrangement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Figure 1:
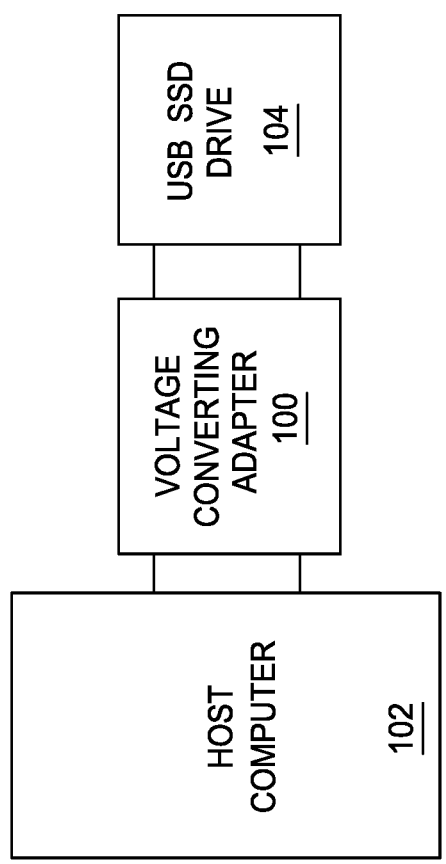
FIG. 1 is a schematic diagram of a USB voltage converting adaptor in a host-SSD configuration in accordance with one example embodiment.

Aspects of the disclosure provide an adaptor plug/receptacle combination that is inserted between the USB host and the USB SSD Drive. FIG. 1 is a diagram of a voltage converting adaptor 100 in accordance with an example embodiment of the disclosure. The voltage converting adaptor 100 is configured to allow a host computer 102 to be connected to a SSD drive 104. The connection between the voltage converting adaptor 100 and the host computer 102 may be either a type A or type C connector. Likewise, the connection between the voltage converting adaptor 100 and the SSD drive 104 may be a type A or type C connector.

In one embodiment, the adaptor 100 improves performance, compared to conventional apparatus, and reduces the heat produced by USB SSD Drives. This can be done by more efficiently converting the power from the USB host to the power needed by the USB SSD Drive circuit elements compared to conventional designs. Circuit components used in USB SSD drive 104 require, at most, 3.3 volts to power drive internal electronics, while host computers 102 deliver nominally 5.0 volts. The voltage delivered by the USB host connection is defined as Vbus voltage 106.

Conventional USB SSD drives use linear regulators to convert the voltages in USB SSD Drives, however this technology is inefficient and wastes about 33% of the power delivered by the host computer 102 through Vbus voltage 106. At present, Vbus voltage 106 is required to provide 5V to the USB SSD Drive 104. USB SSD drive manufactures choose to use low cost linear regulation and suffer performance loss in sustained operation rather than pay for efficient forms of power conversion.

The voltage converting adaptor 100 incorporates a voltage conversion technology that more efficiently reduces the Vbus voltage 106 delivered to the USB SSD drive 104, to a value much closer to the actual required voltage of the USB SSD drive 104. Ideally, this voltage would be 3.3 volts, but the USB SSD Drive's internal circuits require small values of voltage margin above 3.3 volts to maintain proper regulation. This voltage may be set statically, or set by a more sophisticated setup.

Figure 2:
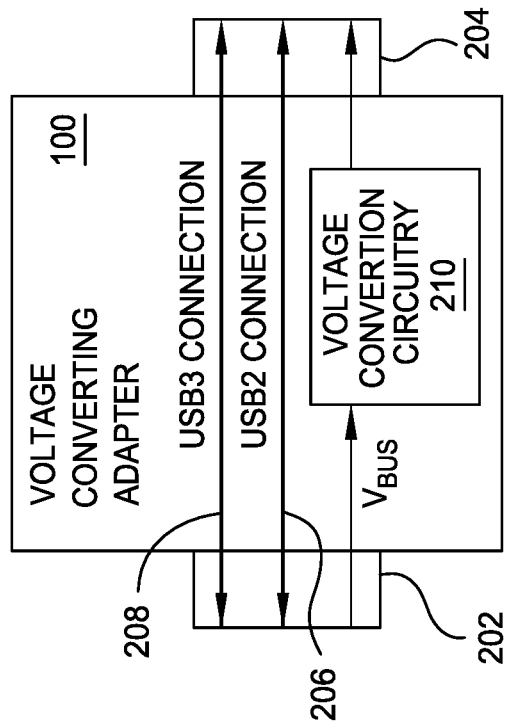
FIG. 2 is an exploded view of the USB voltage reducing adaptor of FIG. 1.

Referring to FIG. 2, one example embodiment of using active circuitry to determine the output voltage of the adaptor is based on which USB interface is active. The voltage converting adaptor 100 is configured with a host side connector 202 and a SSD drive side connector 204. Two different USB connections are provided through the voltage converting adaptor 100. In the illustrated embodiment that should not be considered limiting, a USB2 connection bus 206 is illustrated that extends from the host side connector 202 to the USB SSD drive side connector 204. A USB3 connection bus 208 is also provided, extending from the host side connector 202 to the USB SSD drive side connector 204.

When USB2 connection bus 206 is active, the speed limitation of USB2 is already low, and performance throttling due to thermal issues is negligible. The voltage would be set to one value. If USB2 connection bus 206 is not active, then a lower value could be chosen to better manage the thermal issues. Other arrangements and methods may be used, including a sequenced Vbus voltage 106 by a microcontroller.

A set of voltage conversion circuitry 210 is provided extending from the host side connector 202 to the USB SSD drive side connector 204. The purpose of the voltage conversion circuitry 210 is to accept current at a specific voltage provided from the host 102 and reduce the voltage from a received voltage level to a transmitted voltage level.

In one example embodiment, voltage provided from the host computer 102 is 5 volts. The voltage conversion circuitry 210 accepts the 5 volts and reduces the amount of voltage provided to the USB SSD drive side connector 204 to 3.3 volts. The voltage conversion circuitry 210 may use a straight line set of resistors or may have a voltage divider circuit. Other configurations may use a zener diode or a simple series transistor for voltage reduction. In other embodiments, the voltage conversion circuitry 210 may be provided to allow for a variable voltage output, wherein a variety of voltages may be chosen. Thus, if differing manufacturers of solid state drives have different voltage needs, the voltage conversion circuitry 210 may select the required output without need for physical change of components within the adaptor 100.

In embodiments, a handshake operation may be added to the protocol where the adaptor 100 could have a side band signal that can provide a query, for example to a controller, to adjust voltage levels, based on the state of the USB SSD Drive. USB C has significant spare channels that could be exploited. A USB 3 system could take over the USB 2 channel to perform this negotiation.

The adaptor 100 may be made in four configurations:

a. Type-A plug Host side to Type-A receptacle USB SSD Drive side.

b. Type-A plug Host side to Type-C receptacle USB SSD Drive side.

c. Type-C plug Host side to Type-A receptacle USB SSD Drive side.

d. Type-C plug Host side to Type-C receptacle USB SSD Drive side.

An added benefit of the more efficient conversion of Vbus voltage 106 is that instead of wasting 33% of the power delivered by the host, the host will save 33% of the power consumed by USB SSD Drives, and conserve significant power. This aspect is especially important to battery operated mobile computers such as laptops, notebooks, and tablets. Such conservation of voltage may increase the overall operation of mobile host systems and provide manufacturers with superior operating times on battery power compared with conventional apparatus.

A second embodiment disclosed provides for a reduction of temperature for an improvement of performance. A reduction of temperature may be achieved, for example, for USB SSD drives, by more efficient cooling of the USB SSD Drive. Making the adaptor, for example, from thermally conductive materials that remove heat from the drive by intimate contact with the connector shell of the drive aids in the cooling process. Materials such as aluminum and thermal elastomers may be used. In alternative embodiments, small fins may be added on the adaptor to better radiate heat.

Figure 3:
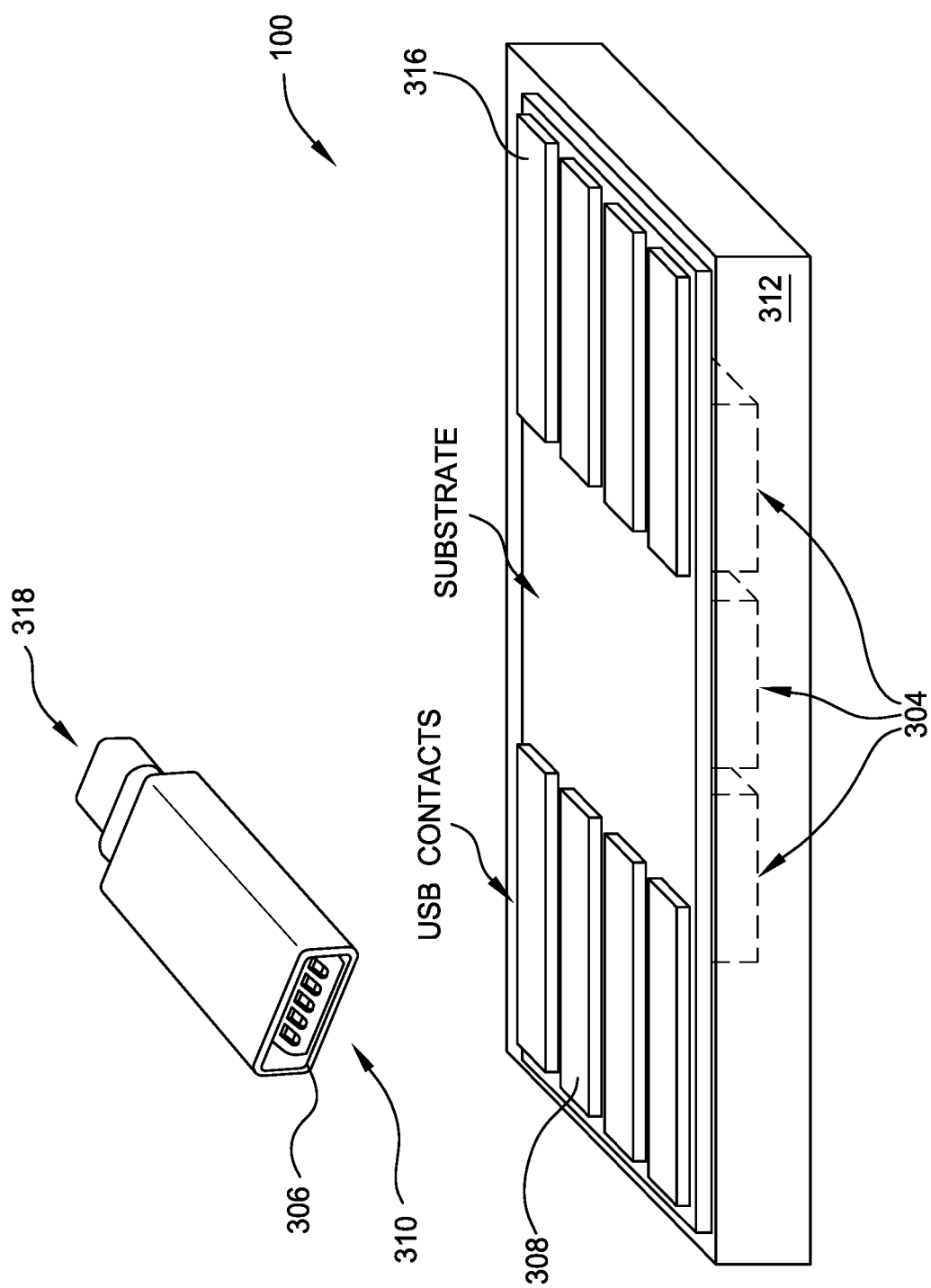
FIG. 3 is an exploded view of a USB adaptor and heat sink, in accordance with another example embodiment.

Referring to FIG. 3, a USB voltage converting adaptor 100 is illustrated with a heat sink. A series of electronic devices, such as integrated circuits, resistors, capacitors and inductors 304 are located on a first side 306 of the adaptor 100. USB contacts 308 are provided to establish a pathway for data and signals to be transmitted back and forth to the adaptor 100 through connection to a host (computer). The USB contacts 308 are located on an open end 310 of the adaptor 300, the USB contacts 308 located on a substrate 312. On the connection end 314 of the adaptor 100, overmold arrangements 316 are provided. A second side 318 is provided as the connection point to a solid state drive, for example.

Also, having a mechanical assembly that would mate with the body of the USB SSD drive, to increase the contact area and thus increase the heat dissipation is another example embodiment of the disclosure. The size and construction of the adaptor may be determined by the available footprint allowed for use by a host computer system manufacturer, for example. Although the disclosed embodiments are shown as having a smooth appearance, other configurations are possible, such as those with heat fins that would allow for transmission of heat from the adaptor internals to cooling fins that could ultimately dissipate heat through air currents within a host system.

Figure 4:
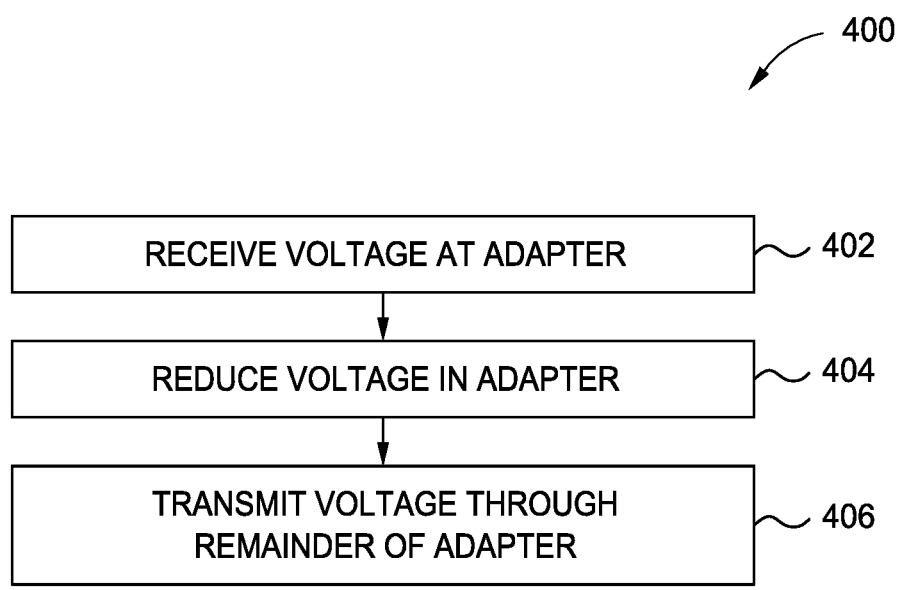
FIG. 4 is a method for reducing a voltage through a USB voltage reduction adaptor.

Referring to FIG. 4, a method 400 for reducing a voltage through a voltage reducing adaptor 100, illustrated in FIG. 1, is provided. A voltage is received at the adaptor at 402. The voltage provided at the adaptor 100 may be, for example, five (5) volts. Such a voltage (5 volts) may be higher than the voltage requirement for a memory arrangement also connected to the voltage reducing adaptor. An example voltage that the memory arrangement operates at may be 3.3 volts. It is therefore preferable to reduce the voltage from the five (5) volts to the 3.3 volts inside the adaptor, instead of providing an overpower situation to the memory arrangement which will result in overheating and non-optimal performance. The input voltage at 402 is then reduced inside the adaptor at 404. The reduced voltage produced at 404 is then transmitted through the remainder of the adaptor at 406. The voltage is eventually supplied to the memory arrangement. In embodiments, data may also be transmitted through the adaptor, therefore the embodiments disclosed should not be considered limiting the disclosure to only voltage.

Figure 5:
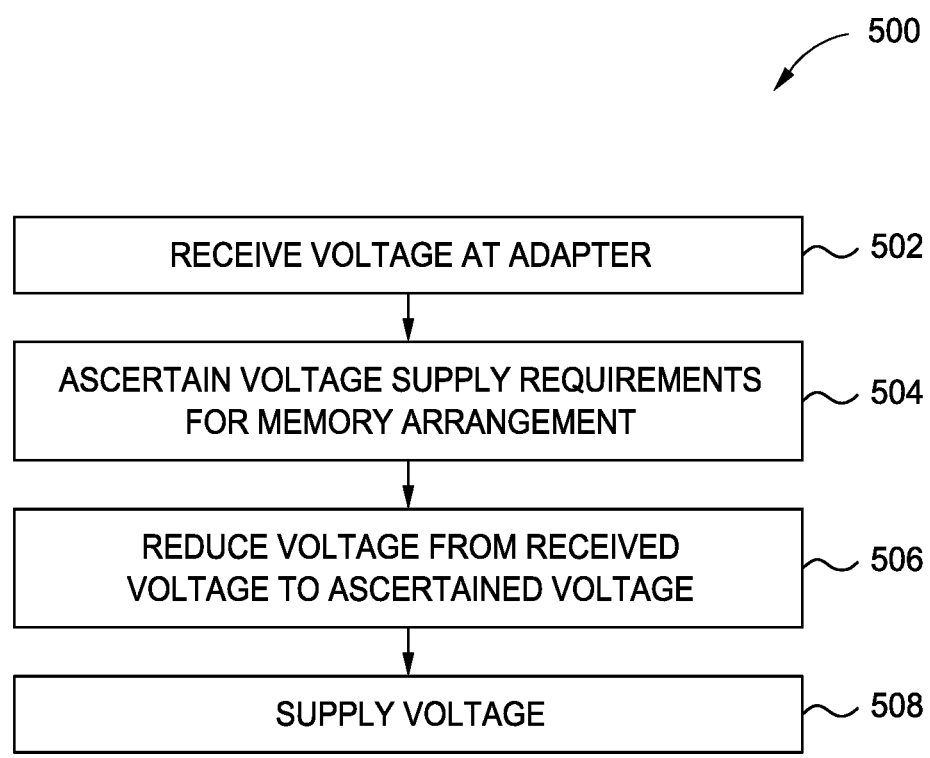
FIG. 5 is a method for receiving voltage, ascertaining a voltage requirement and supplying the voltage requirement to a memory arrangement.

Referring to FIG. 5, a method 500 for receiving, ascertaining voltage requirements and supplying voltage to a memory arrangement, such as a solid state drive, is presented. A voltage is received at the adaptor at 502. The voltage provided at the adaptor 100 may be, for example, five (5) volts. Such a voltage (5 volts) may be higher than the voltage requirement for a memory arrangement also connected to the voltage reducing adaptor. To determine the amount of voltage that is required to be provided to the memory arrangement, the adaptor is configured to ascertain voltage supply requirements for the memory arrangement at 504. After the voltage supply requirements are ascertained at 504, the voltage is reduced by the adaptor 100 to the required voltage requirements ascertained at 504. The reduced voltage is then supplied to the memory arrangement at 506.

For both the methods provided in FIGS. 4 and 5, data may be sent through USB connections from a host computer to the memory arrangement. Voltage dissipation may occur through electrical circuitry placed in the adaptor. The electrical circuitry may be resistors, capacitors, indictors, integrated circuits or other electrical components to effectively reduce the voltage. Adaptors provided in FIGS. 1, 2 and 3 may be used in either of the methods provided in FIGS. 4 and 5.

Advantages of the systems and methods provided in the disclosure allow for an orderly dissipation of voltage from the host bus to a memory arrangement, such as a solid state drive. Such dissipation prevents over-voltage concerns in the solid state drive and eventual heat build-up caused by the over-voltage. Moreover, the solid state drive performance will be positively impacted, as the operating speed of the solid state drive will not have to be reduced due to heat concerns. The adaptor may be advantageous in harsh environments such as automotive where the 5V supply varies significantly including large exception cases that may halt operation or damage the typical USB device. The adaptor may be made immune to most excessive excursions and maintain proper output during short brownout conditions.

Although disclosed as USB compliant, the voltage reducing adaptor may accept other data transfer and power provision protocols. As such, use of the term USB is merely illustrative of other embodiments. Power reducing adaptors may be used for Firewire connections, USB 1.0, USB 2.0 and USB 3.0 as well as different updated versions of these protocols.

Data transmission of through the adaptor may be at different speeds or compliant with multiple modes, such as low-speed (LS) and full speed (FS) mode. High speed (HS) modes may also be used as well as super speed and supper speed+modes, therefore multiple pairs of shielded twisted wires may be used.

In one example embodiment, an arrangement is disclosed comprising: a first connector, a second connector, a body connected to the first connector and the second connector; wherein the first connector is configured to be connected to a computer host, the second connector is configured to connected to a solid state drive, voltage conversion circuitry configured to accept a voltage provided by a computer host at the first connector and reduce the voltage to a voltage output delivered to the second connector and at least one USB bus extending from the first connector to the second connector, the USB bus configured to send and receive signals to and from the computer host and the solid state drive.

In another non-limiting embodiment, the arrangement is configured wherein the one USB bus is two USB buses.

In another non-limiting embodiment, the arrangement is configured wherein a first of the two USB buses operates under USB2 protocol.

In another non-limiting embodiment, the arrangement is configured wherein a second of the two USB buses operates under USB3 protocol.

In another non-limiting embodiment, the arrangement is configured wherein the voltage conversion circuitry allows for a variable voltage output.

In another non-limiting embodiment, the arrangement is configured wherein the first connector is at least one of a type A and type C connector.

In another non-limiting embodiment, the arrangement is configured wherein the second connector is at least one of a type of A and type C connector.

In another non-limiting embodiment, the arrangement is configured wherein the voltage conversion circuitry has a microprocessor configured to control the voltage output to the second connector.

In another example embodiment, an arrangement is disclosed comprising a housing defining an interior volume, the housing configured with a cooling surface area, the housing a first end and a second end, a substrate placed in the interior volume, at least one universal serial bus contact connected to a first side of the substrate, the universal serial bus contact extending to the first end of the housing, at least one overmold section connected to the first side of the substrate, the overmold section extending to the second end of the housing; at least one memory arrangement connected to the at least one universal serial bus, wherein the memory arrangement is configured to store and retrieve data.

In another example embodiment, the arrangement may be configured wherein the housing has a metal plug and socket shell as the cooling surface area.

In another example embodiment, a method of providing an electrical voltage to a memory arrangement is disclosed comprising receiving a voltage at a first value at a voltage reducing adaptor, reducing the voltage from the first value to a second value, transmitting the voltage through the voltage reducing adaptor to the memory arrangement.

In another non-limiting embodiment, the method may be performed wherein the memory arrangement is a solid state drive.

In another non-limiting embodiment, the method may be performed wherein the voltage reducing adaptor is compliant with a universal serial bus protocol in transmitting data.

In another non-limiting embodiment, a method of providing an electrical voltage to a memory arrangement is disclosed comprising receiving a voltage at a first value at an voltage reducing adaptor, ascertaining a voltage supply requirement for the memory arrangement to obtain and ascertained voltage supply requirement, reducing the voltage from the first value to the ascertained voltage supply requirement within the adaptor and supplying the voltage at the ascertained voltage supply requirement to the memory arrangement.

In another example the method may be performed wherein the memory arrangement is a solid state drive.

In another example the method may be performed wherein the voltage reducing adaptor is compliant with a universal serial bus protocol.

In another example an arrangement for providing an electrical voltage to a memory arrangement is disclosed comprising means for receiving a voltage at a first value at an voltage reducing adaptor, means for ascertaining a voltage supply requirement for the memory arrangement to obtain and ascertained voltage supply requirement, means for reducing the voltage from the first value to the ascertained voltage supply requirement within the adaptor, means for transporting data from a first end of the arrangement to a second end of the arrangement and means for supplying the voltage at the ascertained voltage supply requirement to the memory arrangement.

In another embodiment, the arrangement may be configured, wherein the memory arrangement is a solid state drive.

In another embodiment, the arrangement may be configured, wherein the voltage reducing adaptor is compliant with a universal serial bus protocol.

In another embodiment, an arrangement for providing an electrical voltage to a memory arrangement is disclosed comprising means for transmitting data from a first end of the arrangement to a second end of the arrangement, means for receiving a voltage at a first value at an voltage reducing adaptor, means for reducing the voltage from the first value to a second value, means for transmitting the voltage through the voltage reducing adaptor to the memory arrangement, means configured to connect the arrangement to a host computer system to accept the voltage at the first value and means configured to connect the arrangement to the memory arrangement.

In another embodiment, the arrangement may be configured wherein the means configured to connect the arrangement to the host computer system to accept the voltage at the first value is compliant with a universal serial bus protocol.

In another embodiment, the arrangement may be configured wherein the means configured to connect the arrangement to the memory arrangement is compliant with a universal serial bus protocol.

In another embodiment, the arrangement may be configured wherein the memory arrangement is a solid state drive.

In another embodiment, the arrangement may be configured wherein the means for transmitting data from a first end of the arrangement to a second end of the arrangement is at least one universal serial bus.

In another embodiment, the arrangement may be configured wherein the at least one universal serial bus is two universal serial buses.

While the foregoing is directed to embodiments of the present disclosure, other and further embodiments of the disclosure may be devised without departing from the basic scope thereof, and the scope thereof is determined by the claims that follow.

What is claimed is:

1. An arrangement, comprising:
   a first connector;
   a second connector;
   a voltage reducing adaptor coupled between the first connector and the second connector, wherein the first connector is configured to be coupled to a first device, and the second connector is configured to be coupled to a second device;
   voltage conversion circuitry disposed within the voltage reducing adaptor configured to:
     accept a first voltage provided by the first device at the first connector;
     ascertain a voltage supply requirement for the arrangement to obtain an ascertained voltage supply requirement;

reduce the first voltage to a second voltage meeting the ascertained voltage supply requirement; and transmit the second voltage to the second connector, wherein the voltage conversion circuitry is configured to conserve power and reduce an amount of heat produced by the second device; and at least two buses extending from the first connector to the second connector, each of the at least two buses configured to send and receive signals to and from the first device and the second device.

2. The arrangement of claim 1, wherein a first bus of the at least two buses comprises a USB2 connection bus.

3. The arrangement of claim 2, wherein a second bus of the at least two buses comprises a USB3 connection bus.

4. The arrangement of claim 1, wherein the first connector comprises a type A or type C connector.

5. The arrangement of claim 4, wherein the second connector comprises a type A or a type C connector.

6. The arrangement of claim 5, wherein the first connector and the second connector comprise different connectors.

7. The arrangement of claim 1, wherein the voltage reducing adapter comprises:
a substrate;
a series of electronic devices coupled to the substrate; and
device contacts coupled to the substrate.

8. The arrangement of claim 7, wherein the series of electronic devices comprises integrated circuits, resistors, capacitors, or inductors.

9. A system, comprising:
a first memory device connected to the first connector of the arrangement of claim 1; and
a second memory device connected to the second connector of the arrangement of claim 1.

10. A voltage reducing adaptor configured to be coupled between a first device and a second device, comprising:
a substrate;
voltage conversion circuitry coupled to the substrate and configured to:
accept a first voltage provided by the first device;
ascertain a voltage supply requirement for the second device to obtain an ascertained voltage supply requirement;
reduce the first voltage to a second voltage meeting the ascertained voltage supply requirement; and
transmit the second voltage to the second device, wherein the voltage conversion circuitry comprises integrated circuits, resistors, capacitors, or inductors; and
at least two buses coupled to the voltage conversion circuitry and the substrate.

11. The adapter of claim 10, wherein the resistors comprises a straight line set of resistors.

12. The adapter of claim 10, wherein the voltage conversion circuitry comprises a voltage divider circuit.

13. The adapter of claim 10, wherein the voltage conversion circuitry comprises a series transistor.

14. The adapter of claim 10, wherein the voltage conversion circuitry comprises a zener diode.

15. The adapter of claim 10, wherein the adapter comprises a type A receptacle on a first end and a type A receptacle on a second end.

16. The adapter of claim 10, wherein the adapter comprises a type C receptacle on a first end and a type C receptacle on a second end.

17. The adapter of claim 10, wherein the adapter comprises a type A receptacle on a first end and a type C receptacle on a second end.

18. An adapter, comprising:
a substrate;
a type A receptacle coupled to a first end of the substrate;
a type C receptacle coupled to a second end of the substrate;
means to reduce voltage between the first end and the second end, wherein the means to reduce voltage is configured to receive a voltage at a first value at the type A receptacle, ascertain a voltage requirement for a device coupled to the type C receptacle; and reduce the voltage from the first value to and a second value; and
means to supply voltage at the second value to the device coupled to the type C receptacle.

19. The adapter of claim 18, wherein the means to reduce voltage is configured to reduce the voltage based upon a state of the device coupled to the type C receptacle.

20. The adapter of claim 18, wherein the first end comprises overmold arrangements.

* * * * *